United States Patent [19]

Aoshima

[11] 4,313,051
[45] Jan. 26, 1982

[54] ELECTRIC RICE COOKER WITH TWICE COOKING TIMER

[75] Inventor: Terutaka Aoshima, Toyohashi, Japan

[73] Assignee: Tokyo Shibaura Denki Kabushiki Kaisha, Kanagawa, Japan

[21] Appl. No.: 128,244

[22] Filed: Mar. 7, 1980

[30] Foreign Application Priority Data

Mar. 30, 1979 [JP] Japan .................. 54-38971

[51] Int. Cl.³ .............................................. F27D 11/02
[52] U.S. Cl. .................................... 219/441; 99/333; 219/438; 219/492; 219/494; 219/433
[58] Field of Search .................. 99/332, 333; 219/429, 219/430, 438, 433, 439, 441, 442, 492, 493, 494, 509, 510

[56] References Cited

U.S. PATENT DOCUMENTS

| | | | |
|---|---|---|---|
| 2,597,695 | 5/1952 | Braski et al. | 219/441 |
| 2,753,436 | 7/1956 | Schwaneke | 219/441 |
| 2,952,764 | 9/1960 | Minami | 219/441 X |
| 3,190,989 | 6/1965 | Kromatsu | 219/441 X |
| 3,904,852 | 9/1975 | Rivelli et al. | 219/442 |

FOREIGN PATENT DOCUMENTS

| | | | |
|---|---|---|---|
| 3730130 | 2/1971 | Japan | 219/441 |
| 48-83966 | 6/1973 | Japan | 219/441 |
| 54-93454 | 4/1979 | Japan | 219/441 |
| 2025167 | 1/1980 | United Kingdom | 219/441 |

*Primary Examiner*—Volodymyr Y. Mayewsky
*Attorney, Agent, or Firm*—Cushman, Darby & Cushman

[57] ABSTRACT

An electric rice cooker comprising a kettle for containing rice, a heater for heating the kettle, a thermoswitch for deenergizing the heater in response to the temperature of the kettle, and a timer which comprises a motor for causing a movement of the timer and three contacts for controlling the energization and the reenergization of the heater during timer action.

7 Claims, 5 Drawing Figures

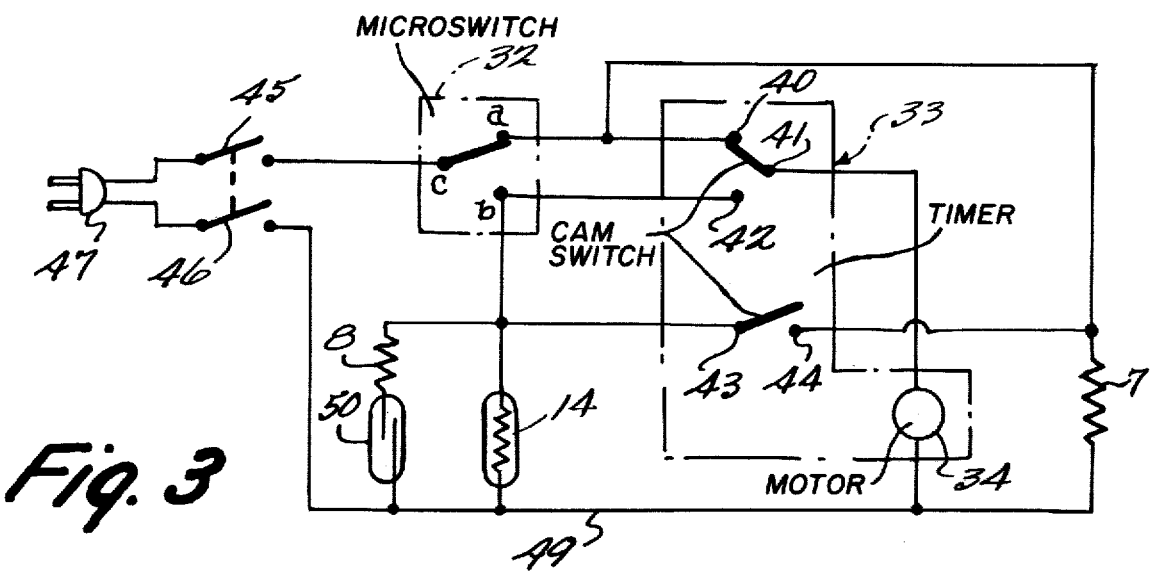
Fig. 3
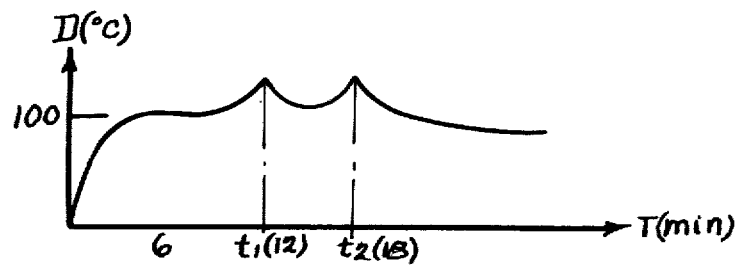
Fig. 4a
Fig. 4b

ELECTRIC RICE COOKER WITH TWICE COOKING TIMER

This invention relates to an electric rice cooker, more particularly to an improvement in a twice cooking timer which has three contacts for controlling the energization and the reenergization of a heater.

It is well known that the best way to boil rice in a cooker of most excellent taste is to heat a cooking kettle and rice twice, so called "twice cooking".

Prior electric rice cookers have a cooking kettle, an electric heater for heating the cooking hettle, a thermoswitch for deenergizing the heater in response to the temperature of the kettle and a timer for reenergizing the kettle. The timer begins timing when the thermoswitch deenergizes the heater, and reenergizes the heater after a fixed time to complete the second cooking. But in these prior electric rice cookers, the timer has to be set at the beginning of cooking by winding up a spring thereof, and the place where it is installed in the cookers is restricted, for example near a switch cover. Two manual actions namely setting the timer and setting the thermoswitch are required and this is another problem of prior electric rice cookers.

It is an object of this invention to provide an electric rice cooker which is improved in operation.

It is another object of this invention to provide an electric rice cooker which is not restricted in the place where a twice cooking timer is installed.

It is further object of this invention to provide an electric rice cooker which is able to reenergize a heater for a definite period after the thermoswitch deenergizes the heater.

This invention relates to an electric rice cooker with twice cooking timer having a first, second and third contact. The first and second contacts are closed alternatively during the timer action and the third contact is closed at the end of a definite time after the second contact is closed by a timing element, thereby energization, deenergization and reenergization of a heater for heating a cooking kettle and contents there of are proceeded.

Other object and features of the invention will become apparent to those skilled in the art as the disclosure is made in the following description of a preferred embodiment of the invention, as illustrated in the accompanying sheet of drawings in which:

FIG. 3 is a wiring diagram according to the invention;

FIG. 4(a) shows a relationship between the temperature and the cooking time according to the invention; and FIG. 4(b) shows a timing chart according to the invention.

Figure 1:
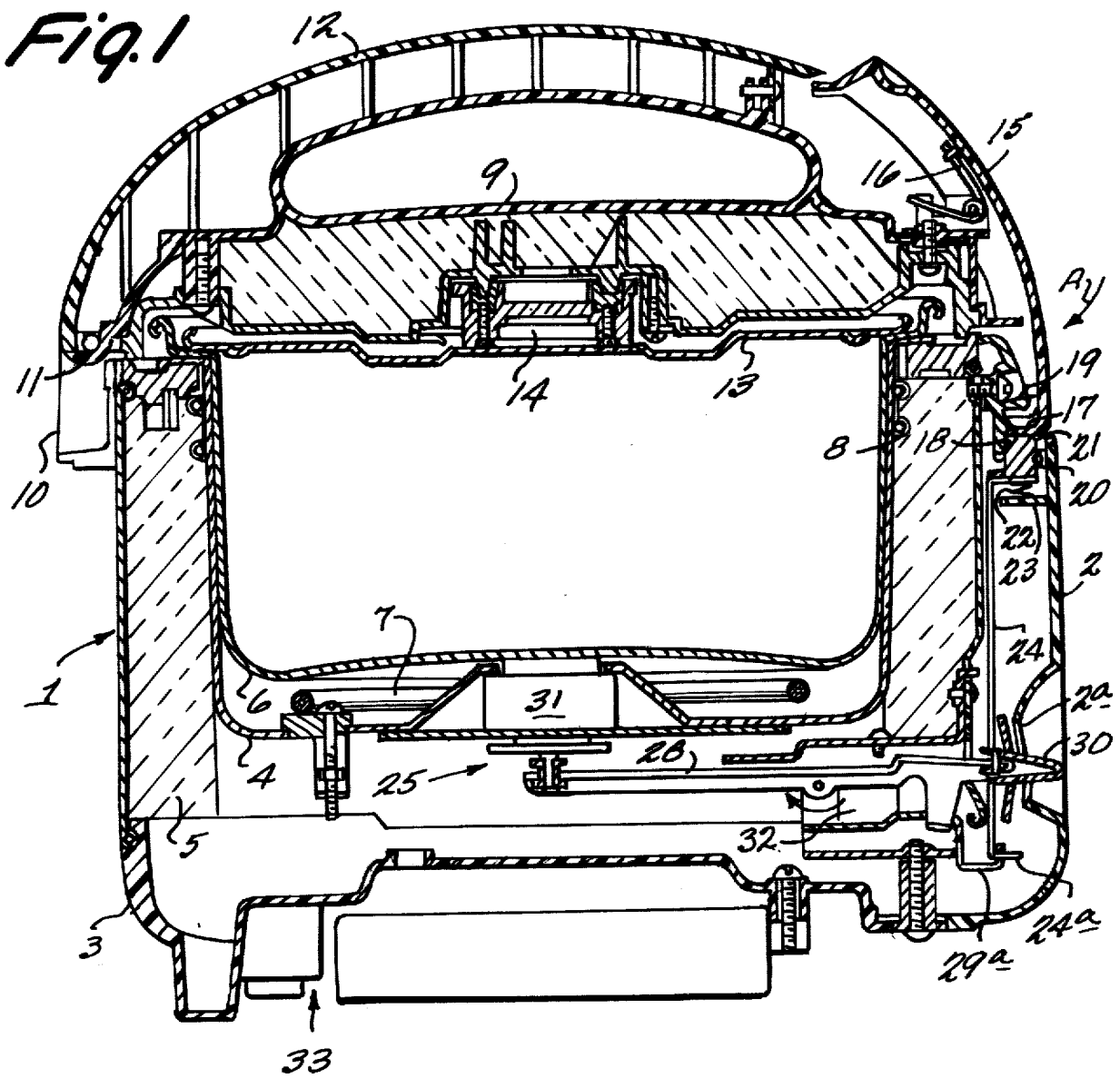
FIG. 1 is a fragmentary sectional view of an electric rice cooker accoring to this invention.

Now there will be described this invention according to Figures. An outer case 1 is formed substantially cylindrical. A face cover 2 is mounted for covering a part of outer case 1, and a bottom frame 3 is mounted on the lower portion of outer case 1 and face cover 2. An inner case 4 is separated from the inside of outer case 1 by a heat insulator 5. A kettle 6 is detachably located in inner case 4. A sheathed heater 7 is located in the bottom of inner case 4 and adjacent the outside surface of kettle 6 for heating kettle 6. A warming heater 8 is mounted about the outer surface of the upper portion of inner case 4 for keeping kettle 6 and the contents thereof warm. An outer lid 9 is pivotably mounted by a hinge 10 which is secured on the top of outer case 1 by a pivot 11. A handle 12 is integrally molded with outer lid 9. An inner lid 13 is secured to the inner surface of outer lid 9 and a lid heater 14 is mounted thereon. A lock lever 15 is pivotally mounted on the end portion of handle 12 and is usually urged by coil spring 16 in the direction shown by arrow A (see FIG. 1). A hook 17 is integrally formed with lock lever 15.

A recess 18 and a projection 19 for engaging with hook 17 are integrally formed with face cover 2. A hole 20 is formed in recess 18 of face cover 2 adjacent to projection 19. A button 21 is slidably supported in hole 20 by coil spring 22 which is located between button 21 and spring holder 23 of face cover 2. Button 21 is pushed downwardly when hook 17 engages projection 19 in accordance with closing outer lid 9. The tip of a rod 24 is mounted under button 21 so that rod 24 is able to move, rise and fall by coil spring 22.

A thermoswitch 25 for deenergizing heater 7 separates as follows. A supporting frame 26 is located beneath outer case 1 and has an operating lever 28 and an arm 29 secured thereto by means of a pin 27. Arm 29 has a hole 29a and a bent portion 24a of rod 24 is inserted into hole 29a. A knob 30 is mounted on the one tip of operating lever 28 and projects through a hole 2a of face cover 2. A thermo-sensor 31 is mounted on the other tip of operating lever 28. Thermo-sensor 31 includes a magnetic member which rapidly decreases its magnetic permeability at a predetermined temperature (for example 130° C.) and a permanent magnet. Then, at room temperature, when operating lever 28 is rotated by operating knob 30 to the direction indicated by arrow B, the permanent magnet holds the magnetic member for keeping the set position of operating lever 28. At about the predetermined temperature, operating lever 28 is rotated to its reset position by a spring (not shown) because the magnetic attraction between the permanent magnet and the magnetic member vanishes. A microswitch 32 is operated by operating lever 28 and contact (c-a) thereof is closed when operating lever 28 is rotated to its set position and contact (c-b) thereof is closed when operating lever 28 is rerotated to its reset position.

Figure 2:
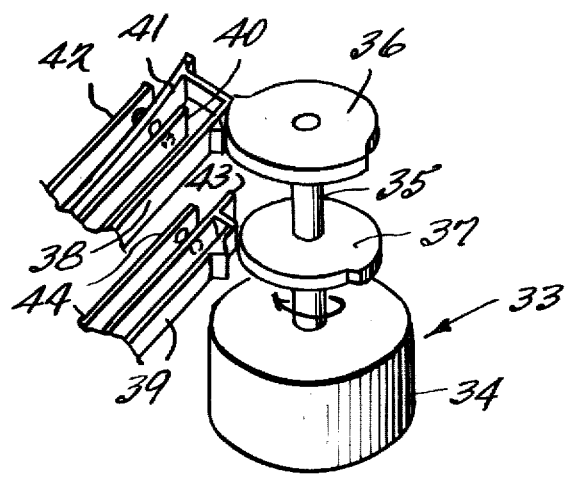
FIG. 2 is an enlarged perspective view of a twice cooking timer according to the invention.

A twice cooking timer 33 for repeating a timer action is secured under bottom frame 3. Referring to FIGS. 2 and 3, a timer motor 34 rotates a shaft 35 to the direction indicated by the arrow C and one rotation of shaft 35 takes 12 minutes. Timing elements such as cam plates 36 and 37 are secured on shaft 35. Contact blades 38 and 39 are actuated by cam plates 36 and 37 respectively. Contact blades 38 and 39 close a first contact (40–41), second contact (41–42) and third contact (43–44) as shown in the shaded line zones in FIG. 4(b). Power switches 45 and 46 are located in thermoswitch 25 and are closed by arm 29 when arm 29 is rotated to the direction indicated by the arrow B in response to the downward movement of button 21 and rod 24 which is caused by projection 19. Power switches 45 and 46 are opened when arm 29 is rotated to the counter direction indicated by the arrow B in response to the upward movement of button and rod 24 by coil spring 22 which is caused by the disengagement of hook 17 and projection 19 when lock lever 15 is rotated in the direction opposite to that indicated by the arrow A. One end of a plug 47 is connected to line 48 through power switch 45 and the contact (c-a) of microswitch 32 and the other end thereof is connected to line 49. Heater 7 is connected between two lines 48 and 49, and first contact (40-41) and motor 34 are also connected between two lines 48 and 49 in parallel. Blade 42 of second contact (41-42) is connected to a stationary contact (b) of microswitch 32. Lid heater 14 is connected between contact (b) of microswitch 32 and line 49, and heater 8 and thermostat 50 are connected in parallel between contact (b) and line 49.

The operation of this invention will now be described. A predetermined quantity of rice and water corresponding to the quantity of rice are put into kettle 6. After loading kettle 6 into inner case 4, inner lid 13 and outer lid 9 close the opening of outer case 1 and kettle 6 by the rotation of outer lid 9 around pivot 11 as fulcrum with handling handle 12. Then, outer lid 9 is kept in closed condition by the engagement of hook 17 of lock lever 15 and projection 19. When hook 17 engages with projection 19, button 21 is depressed by hook 17 against the spring force of coil spring 22, and according to the moving of rod 24, power switch 45 and 46 are closed by the rotation of arm 29 around pin 27 as a fulcrum to the direction indicated by arrow B. Thermoswitch 31 is raised and is kept in its set position by the rotation of operating lever 28 around pin 27 as a fulcrum to the direction indicated by arrow B with depressing knob 30. Then, heater 7 is energized through contact (c-a) of microswitch 32, and the first cooking step starts. At the same time as the start of cooking, timer 33 begins its timer action because motor 34 is energized through contact (c-a) of microswitch 32 and first contact (40-41). The temperature of the bottom of kettle 6 and the contents thereof gradually rise by heating directly from heater 7 and heating radiantly from inner case 4 as shown in FIG. 4(a). Timer 33 temporarily stops the action thereof when, for example, six minutes pass from the start of the cooking.

The temperature of kettle 6 suddenly rises higher than 100° C. when the water in kettle 6 is absorbed by rice or evaporated to the so called dried up condition (time $t_1$, of time scale of FIG. 4(a)). Then, at about 130° C., the magnetic attraction between the magnetic member and the permanent magnet vanishes because the magnetic member of thermo-sensor 31 decreases the magnetic permeability thereof, and operating lever 28 is rotated to its reset position (opposite the arrow direction) because thermo-sensor 31 is moved to its reset position. According to the reset of operating lever 28, heater 7 is deenergized by the opening of contact (c-a) and the closing of contact (c-b) of microswitch 32, and the timing action of timer 33 resumes through contact (c-b) of microswitch 32 and second contact (41-42) because cam plate 36 hits contact blade 38 for engaging second contact (41-42) by its projection. Then, the second cooking step starts. After five minutes pass from the reaction of timer 33, heater 7 is reenergized through contact (c-b) and third contact (43-44) because cam plate 37 hits contact blade 39 for engaging third contact (43-44) by its projection. Next, the third cooking step starts. After six minutes pass from the reaction of timer 33, namely, after one minute past from the reenergization of heater 7 (Time $t_2$ of time scale of FIG. 4(a)), heater 7 is deenergized again by the opening of second contact (41-42) and the closing of first contact (40-41).

Thus, one cycle is finished and timer 33 returns to the condition of before cooking.

After cooking has been finished, the boiled rice is kept warm by heaters 8 and 14 through contact (c-b) of microswitch 32.

This invention is not restricted to the above mentioned embodiment. Many changes and modification from the above embodiment can be carried out without departing from the scope of the invention, that scope being defined only by the scope of the appended claims.

What is claimed is:

1. An electric rice cooker comprising:
    a cooking kettle for containing water and rice to be cooked;
    a removable lid covering the top of said kettle;
    electrical heater means mounted adjacent the outside surface of said kettle for heating said kettle and the contents thereof;
    thermally insulating frame means for supporting and enclosing said kettle and heater means; and
    circuit means for connecting and disconnecting said heater means from a source of electrical energy to carry out a plurality of cooking steps in a predetermined period including a thermoswitch for detecting the temperature of said kettle and having a first position connecting said source to said heater means for heating said kettle and contents and a second position disconnecting said heater means in response to detection of a predetermined temperature, a means for timing having a first controlled switch in a first position connecting said timing means to said source through said thermoswitch when said thermoswitch is in said first position to activate said timing means, said first switch being shifted to a second position a first predetermined time after actuation to disconnect said timing means from said source and said timing means being reactivated when said thermoswitch is in said second position connecting said source to said timing means through said first switch and having a second controlled switch connecting said heater means to said source through said thermoswitch in said second position for a second predetermined time period beginning a third predetermined time after reactivation of said timing means.

2. The electric rice cooker as in claim 1, wherein said timing means includes a timing cam for operating said controlled switches and a shaft for mounting said timing cam.

3. The electric rice cooker as in claim 2, wherein said timing cam comprises two cam plates one of which operates said first switch and the other of which operates said second switch.

4. The electric rice cooker as in claim 1, wherein said lid includes a lid heater connected to said circuit means for heating said contents of said kettle from the upper portion thereof.

5. The electric rice cooker as in claim 4, wherein said lid heater is connected to said source by said thermoswitch in said second position thereat so as to be energized after said thermoswitch disconnects said heater means.

6. A cooker as in claim 1, wherein said frame means includes an inner and outer case and thermal insulation between said cases.

7. A cooker as in claim 6, wherein said timing means includes a motor mounted in the bottom on said inner case.

* * * * *